Nov. 1, 1955

J. GOSCILO 2,722,316

WATER FILTERS FOR THE COOLING SYSTEMS
OF INTERNAL COMBUSTION ENGINES

Filed Dec. 29, 1952

INVENTOR.
JOSEPH GOSCILO
BY
*Joseph F. O'Brien*
ATTORNEY

Nov. 1, 1955
J. GOSCILO
2,722,316
WATER FILTERS FOR THE COOLING SYSTEMS
OF INTERNAL COMBUSTION ENGINES
Filed Dec. 29, 1952
2 Sheets-Sheet 2
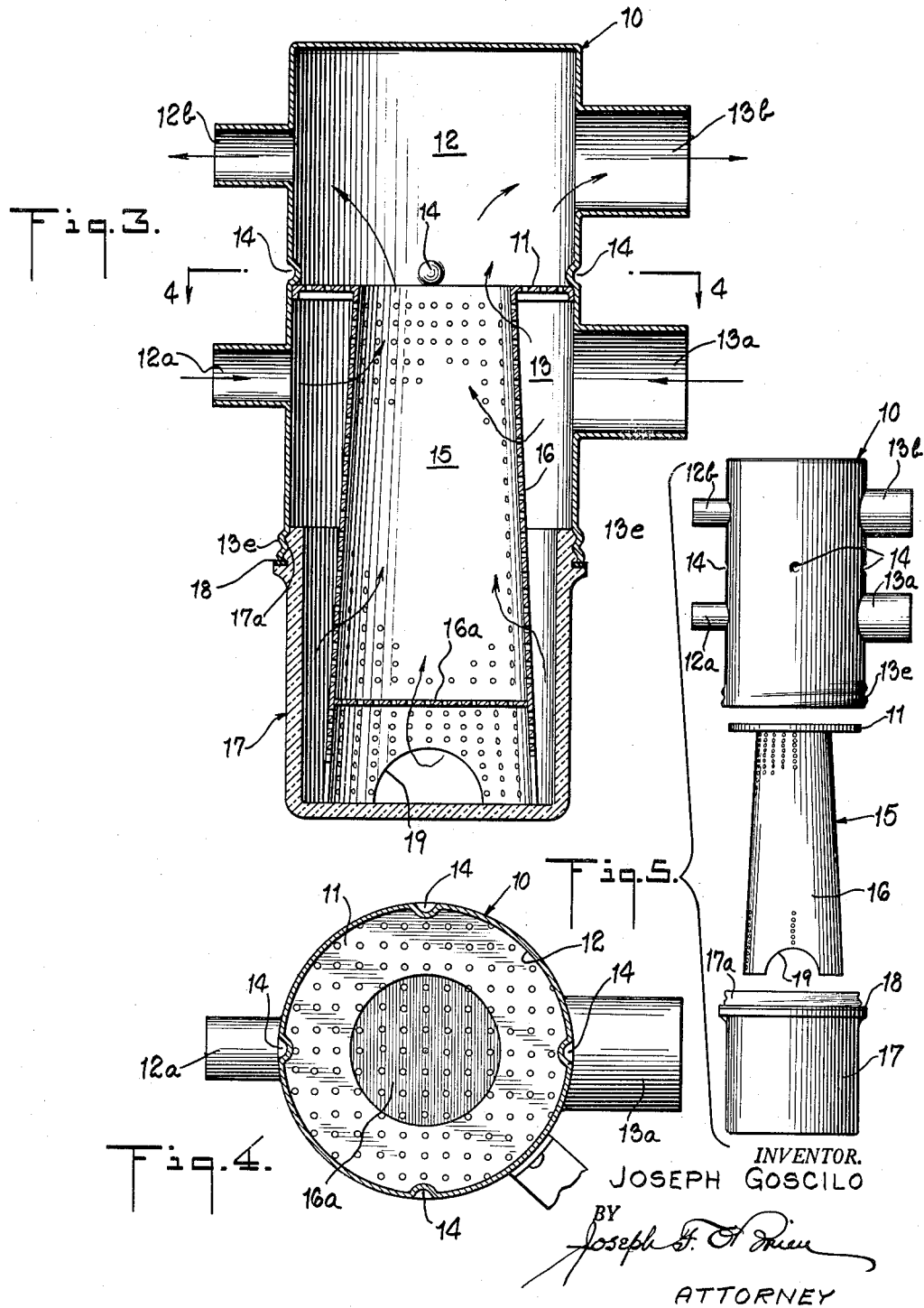
INVENTOR.
JOSEPH GOSCILO
BY
ATTORNEY

United States Patent Office 2,722,316
Patented Nov. 1, 1955

2,722,316

WATER FILTERS FOR THE COOLING SYSTEMS OF INTERNAL COMBUSTION ENGINES

Joseph Goscilo, Mount Vernon, N. Y.

Application December 29, 1952, Serial No. 328,360

3 Claims. (Cl. 210—165)

This invention relates to improvements in water filters for the cooling systems of internal combustion engines.

My invention relates to a free-flowing water filter of simple construction comprising few strong and rigid parts that may be manufactured at low cost and may readily and easily be assembled and inserted in the cooling system of an internal combustion engine.

More especially my water filter comprises a strong and durable filter casing adapted to be inserted between the engine block and the radiator and having inlet and outlet apertures, a strainer or screening member mounted in said casing to provide a free flow of water therethrough and adapted to filter water passing from the engine block through said water filter to the radiator and to screen out any sediment therein and a sediment-container for entrapped sediment which is capable of ready removal from the filter casing.

Another object of this invention is to provide a water filter having a screening element provided with a relatively large screening area.

Another object of my invention is to provide a water filter composed of only three parts, comprising a casing adapted to be fixedly mounted, a screening element telescopically mounted in and having an end portion projecting outwardly from the casing and a combined end closure and sediment container slidable over said projecting end.

Another object of my invention is to provide a cylindrical two-part filter casing combined with a screening member that is telescopically mounted in the casing to permit ready insertion and removal without tools for the purpose of cleaning.

Another object of my invention is in a device of the character specified to provide a sediment container which is transparent to show sediment therein and through the wall of which the condition of the screening member will be visible, thus enabling the user to see the condition of both the sediment container and the screening element.

Another object of my invention is to provide a filter construction in which the inlet and outlet apertures are unobstructed by the screening member and provide for a free flowing of water through said apertures and through the screening member.

Another object of my invention is to provide a completely unobstructed outlet chamber in combination with an inlet chamber in which the screening member is positioned axially to cause the inlet aperture or apertures also to be free from obstruction and to provide for a free flow of water therethrough.

Still another object of my invention is to provide a filter construction comprising a cylindrical casing having outlet and inlet chambers separated by a disc extending transversely in the casing and a screening member of substantially cylindrical conformation is supported in said casing by said transverse disc in axially-disposed position and in spaced relationship from inlet apertures in said casing.

Still another object of my invention is to provide a filter construction comprising a metallic filter casing and a strainer member supported therein but extending below the metallic casing to provide a relatively large filtering area.

Still another object of my invention is to provide a filter construction which is of sufficently large screening area to efficiently screen the cooling water from the engine to the radiator and also to screen the water passing between inlet and outlet of a car heater.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 3 is a section on the line 3—3 of Fig. 1 looking in the direction of the arrows;

Fig. 4 is a section on the line 4—4 of Fig. 3; and

Fig. 5 is an exploded view of the filter showing the filter and sediment collector removed.

Figure 1:
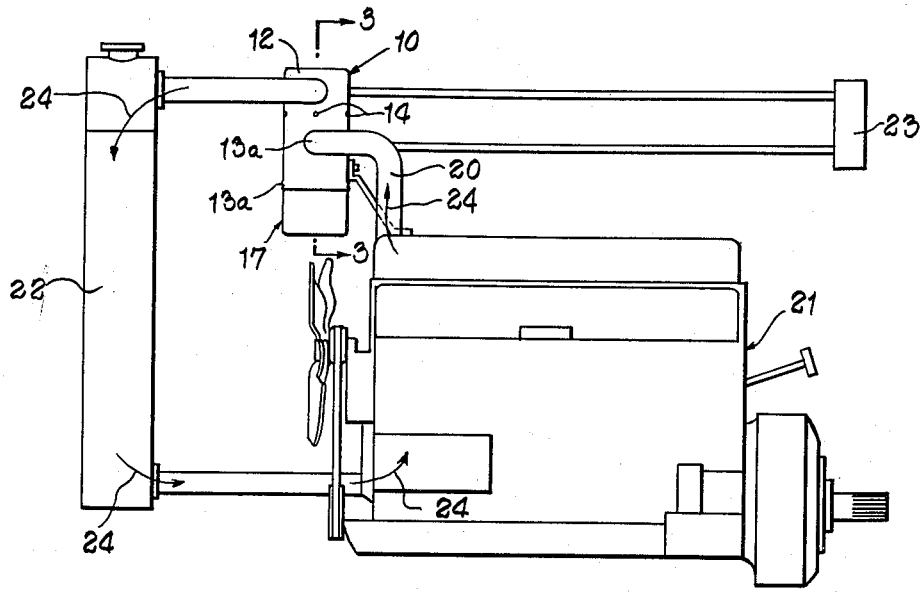
Fig. 1 is a side elevation of a filter device embodying my invention as shown applied to a radiator and engine block of an internal combustion engine.

Referring now to these drawings which illustrate a preferred embodiment of my invention, my improved filtering device comprises a metallic casing 10 which is divided by a transverse disc 11 into a plurality of chambers comprising an upper outlet chamber 12 which is completely unobstructed and a lower inlet and filtering chamber 13. The casing is cylindrical in configuration and the chambers 12 and 13 are likewise cylindrical. The said transverse disc 11 is circular and is positioned and held in place by providing in the walls of the cylindrical casing a series of indentations or stamped-up bends 14 which extend inwardly around the inner circumference of the cylinder and conjointly engage and stop the circular flange 11 which itself is perforated and carries a frustroconic filtering or screening member 15. The disc 11 is mounted between outlet apertures 12$^b$, 13$^b$ and inlet apertures 12$^a$, 13$^a$ and the screening member 15 primarily comprises a perforated frustro-conic shell or hollow member 16 which is carried by said disc in spaced relationship to the wall of the casing and extends below the metallic inlet compartment 13. Said casing is preferably formed of metal and the lower end of the inlet compartment 13 is provided with an integral screw thread 13$^e$ which is adapted to engage a similar thread 17$^a$ on the top edge of a removable sediment container 17. The sediment-container 17 is preferably formed of glass and the transparence of the member 17 enables visualization of any sediment contained therein.

As shown the perforated frustro-conic shell or hollow screening member 15 extends about half of its length below the screw-threaded connection between the metallic casing and the glass sediment containing member 17, thus enabling manual engagement of said lower end for insertion into or removal of the same from the casing for the purpose of cleaning or renewal, it being understood that the joint at the bottom of the casing will be so formed as to permit ready withdrawal of the disc 11 through such screw-threaded lower end of the wall of the inlet chamber in a telescopic movement of the two parts. The inner bottom surface of the glass sediment container 17 during its screwing movement will engage the bottom edge of the shell 16 to retain the top part thereof in engagement with the stamped-up indentations or bends 14, thus providing secure locking of the member 16 within the casing 10, and preventing any rattling thereof. The transparence of the sediment container 17 will also permit visualization of the bottom portion of the frustro-conic perforated and hollow shell 16. The screw connection between the casing 10 and container 17 is provided with an intervening gasket element 18 of rubber or other suitable material to provide a liquid seal or liquid tight joint between said parts.

As shown, the frustro-conic perforated member 16 is provided at its lower end with a plurality of large water-passing apertures 19 to lead water toward the axis of said member 16 and a perforated circular cross plate 16$^a$ is positioned across said axis to filter liquid which passes through the apertures 19 and increase the screening area.

The inlet aperture 13$^a$ is connected to a conduit 20 of an engine block 21 and when so positioned water from the motor will pass in through the casing aperture 13$^a$, will then be partially filtered by the disc 11 and frustro-conic walls 16. Some of such water will pass downwardly through the apertures 19 and then upwardly through the perforated circular cross plate 16$^a$, and then out through the aperture 13$^b$ to a radiator 22.

Figure 2:
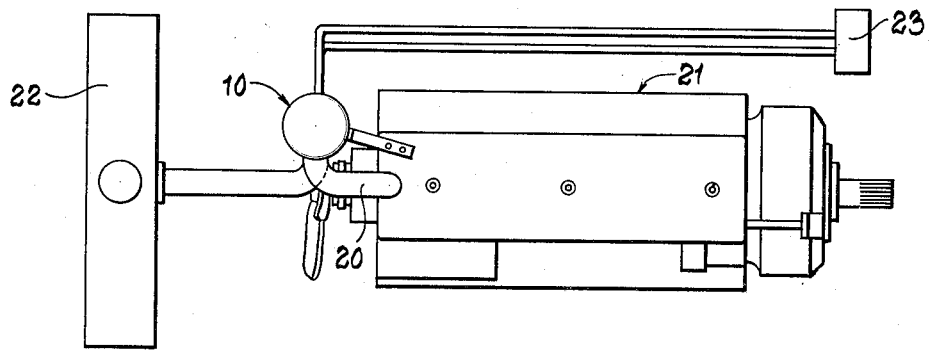
Fig. 2 is a view in plan of the structure shown in Fig. 1.

In the preferred form of my invention (see Figs. 1, 2 and 3), I preferably also provide smaller inlet and outlet connections or apertures 12$^a$, 12$^b$ in my filter casing for filtering water from the water heater 23 of the motor. In view of these additional inlet and outlet apertures, the water of the water heater 23 as well as the cooling water which passes between the engine block 21 and the radiator 22 will be compelled to pass through the filter or screening member and, following the directions of the arrows 24, will be duly filtered. Thus the water of the water heater 23 passing through the connections 12$^a$, 12$^b$ will be efficiently filtered, and a sufficient filtering surface or area is provided for filtering the increased amount of water from both sources.

In the construction shown, it will be seen that the filter or screening member 16 is extensive in area and inlet and outlet openings are unobstructed by the screening element and unobstructed inlet and outlet chambers are also provided as well as sufficient filtering space. I have thus provided an increased filtering area over structures which comprise screening members that merely extend over inlet and outlet openings. I provide in my filter an unobstructed annular inlet chamber surrounding an axially-positioned screening member and this inlet chamber is separated by a transverse disc from an unobstructed outlet chamber occupying the entire area of the casing above said disc. My casing and telescoping or axially-positioned parts are adapted to permit increased and free-flowing distribution of the liquid which passes through the inlet openings to all parts of the perforated filtering screen. This arrangement of parts not only provides a screening member of large and increased area, but also provides a filter that may be used for a much longer period of time without cleaning than is required in filters having screening members which are utilized to screen only the inlet and outlet apertures and small sections adjacent thereto.

Having described my invention, I claim:

1. In a water filter for the cooling system of an internal combustion engine, a filter casing comprising two separable parts composed of a hollow opaque metallic upper section adapted to be mounted in fixed position between the engine block and radiator of an internal combustion engine and having inlet and outlet apertures spaced vertically in relation to each other and a removable transparent lower section, a removable screening member mounted to move telescopically in said fixed opaque section and having a screening surface of greater area than the said hollow, opaque metallic section and comprising a perforated transversely-extending supporting portion normally positioned to extend across the axis of said casing between said vertically-spaced inlet and outlet apertures to separate said two part casing into inlet and outlet chambers, said supporting portion being slidable frictionally along the inner wall of the fixed upper section of the casing and having an elongated perforated annular screen body portion connected thereto and projecting downwardly below said fixed casing section into said removable transparent lower section to provide means adapted, upon removal of said transparent removable casing section, for manual engagement and removal of the screening member from its mounted position by a telescopic movement thereof, said outlet chamber being completely unobstructed and said inlet chamber having the body portion of the screening member mounted axially therein and spaced from the wall of the opaque casing section and from the inlet aperture therein, whereby a free flow of strained water through the inlet and outlet apertures is provided for, and said transparent removable lower section also functions as a sediment container, and a holder for the screening member.

2. In a water filter for the cooling system of an internal combustion engine, a filter casing adapted to be fixedly mounted between the engine block of an internal combustion engine and the radiator thereof and comprising three parts composed of an opaque, cylindrical metallic casing section closed at its upper end, open at its lower end and having two pairs of inlet and outlet nipples positioned at the cylindrical sides thereof between its ends and adapted to be fixedly connected to the cooling system of the engine, a screening member of greater area than said hollow, opaque section and comprising a transversely-extending perforated supporting portion normally supported, seated and retained in a position between said two pairs of nipples and slidably mounted in said cylindrical metallic casing section and a perforated screen body portion having an extension projecting below said metallic casing section, and a hollow transparent removable casing section releasably secured to said fixed casing part and enclosing said extension of said perforated screen body to provide for visual examination of said screening member during operation and ready access to and removal thereof from said casing, and also functioning as closure for the lower end of said casing and as a container for entrapping sediment falling from said screening member.

3. A water filtering device as claimed in claim 1 in which the upper section of said filter casing comprises a metallic casing provided intermediate its ends with a series of stamped up indentations to form stops for the transversely extending supporting member of the perforated screen and having at its lower end an integral screw thread and the bottom section comprises a glass container provided at its upper end with a screw thread engageable with the integral screw thread of the metallic casing, the screening member comprises a perforated supporting disc mounted to slide along the internal surface of said upper section and carrying a tubular screen body, both fitted within said two part casing and the extension at the lower end of said screening member is engaged by the bottom of said glass container to cause said screening member to be securely held within said two part casing by said screw-threaded connection.

References Cited in the file of this patent

UNITED STATES PATENTS

| | | |
|---|---|---|
| 441,667 | Jewell et al. | Dec. 2, 1890 |
| 1,477,885 | Lehmann | Dec. 18, 1923 |
| 1,692,852 | Morris | Nov. 27, 1928 |
| 2,322,131 | Heftler | June 15, 1943 |
| 2,567,062 | Edelen | Sept. 4, 1951 |
| 2,603,353 | Cooney | July 15, 1952 |
| 2,657,805 | Palcer | Nov. 3, 1953 |